(12) United States Patent
Chen et al.

(10) Patent No.: US 12,056,440 B2
(45) Date of Patent: Aug. 6, 2024

(54) DOCUMENT UPDATE METHOD AND APPARATUS, DEVICE, AND MEDIUM

(71) Applicant: BEIJING ZITIAO NETWORK TECHNOLOGY CO., LTD., Beijing (CN)

(72) Inventors: Wei Chen, Beijing (CN); Xuejia Chen, Beijing (CN); Guangping Xie, Beijing (CN); Zongyan Wei, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/459,327

(22) Filed: Aug. 31, 2023

(65) Prior Publication Data
US 2023/0409816 A1    Dec. 21, 2023

Related U.S. Application Data

(63) Continuation of application No. PCT/CN2022/077871, filed on Feb. 25, 2022.

(30) Foreign Application Priority Data

Mar. 1, 2021    (CN) .......................... 202110226940.2

(51) Int. Cl.
*G06F 40/166*    (2020.01)
*G06F 16/178*    (2019.01)

(52) U.S. Cl.
CPC .......... *G06F 40/166* (2020.01); *G06F 16/178* (2019.01)

(58) Field of Classification Search
CPC ..................................................... G06F 40/166
See application file for complete search history.

(56) References Cited

U.S. PATENT DOCUMENTS

| | | | |
|---|---|---|---|
| 2008/0072225 A1* | 3/2008 | Nagatsuka et al. | ....... G06F 9/46 |
| 2014/0013204 A1 | 1/2014 | Theis et al. | |
| 2016/0328368 A1* | 11/2016 | Hyams et al. | .......... G06F 17/22 |

(Continued)

FOREIGN PATENT DOCUMENTS

| | | |
|---|---|---|
| CN | 103578073 A | 2/2014 |
| CN | 103907110 A | 7/2014 |
| CN | 105117382 A | 12/2015 |

(Continued)

OTHER PUBLICATIONS

International Search Report (with English translation) and Written Opinion issued in PCT/CN2022/077871, dated Apr. 29, 2022, 8 pages provided.

(Continued)

*Primary Examiner* — James J Debrow
(74) *Attorney, Agent, or Firm* — HSML P.C.

(57) ABSTRACT

A document update method, a device, and a medium are provided. The method comprises: receiving an editing operation for a target reference object in a first document, the target reference object being a content block included in the first document; in response to the editing operation, updating the target reference object in the first document; and sending update information to a server for the server to update a target reference object in a second document on the basis of the update information.

17 Claims, 13 Drawing Sheets

---

Receive an editing operation on a target reference object in a first document — S110

In response to the editing operation, update the target reference object in the first document — S120

Send update information a server, to allow the server to update the target reference object in a second document based on the update information — S130

(56) References Cited

U.S. PATENT DOCUMENTS

2023/0401377 A1* 12/2023 Chen et al. ........... G06F 40/166

FOREIGN PATENT DOCUMENTS

| | | |
|---|---|---|
| CN | 107710189 A | 2/2018 |
| CN | 109597976 A | 4/2019 |
| CN | 110019279 A | 7/2019 |
| CN | 111858518 A | 10/2020 |
| EP | 4167102 | 4/2023 |

OTHER PUBLICATIONS

Chinese Office Action, issued in Chinese patent application No. 202110226940.2, dated Feb. 23, 2024, 26 pages (translation enclosed).

* cited by examiner

From:Document B  User A  Last update is performed on January 16, 2021

XXXXXXXXXXXXXXXXXXXXXXXX
XXXXXXXXXXXXXXXXXXXXXXXX
XXXXXXXXXXXXXXXXXXXXXXXXXX
XXXXXXXXXXXXXXXXXXXXXX
XXXXXXXXXXXXXXXXXXXX
XXXXXXXXXXXXXXXXXX
XXXXXXXXXXXXXX
XXXXXXXXXXXX

Figure 3

In response to a reference operation on the target reference object in the second document, acquire the target reference object and/or association information of the target reference object — S210

Render the target reference object and/or association information of the target reference object to the first document — S220

Receive an editing operation on the target reference object in the first document — S230

In response to the editing operation, update the target reference object in the first document — S240

Send update information a server, to allow the server to update the target reference object in the second document based on the update information — S250

Figure 4

DOCUMENT UPDATE METHOD AND APPARATUS, DEVICE, AND MEDIUM

This application is a continuation application of International Application No. PCT/CN2022/077871, filed on Feb. 25, 2022, which claims priority to Chinese Patent Application No. 202110226940.2, titled "DOCUMENT UPDATE METHOD AND APPARATUS, DEVICE, AND MEDIUM", filed on Mar. 1, 2021 with the China National Intellectual Property Administration, both of which are incorporated herein by reference in entireties.

FIELD

The present disclosure relates to computer document data processing technology, in particular to a method, apparatus and device for document update and a medium.

BACKGROUND

With the increasing demand for collaborative working, there may be multiple shared documents within the office. During the actual collaborative working, in order to avoid too much explanation for the same content in multiple documents, the explanation can be directly stored in a manner of referencing between the multiple documents. However, in practical operation, after editing target content in a current document, other documents that reference the current document need to re-reference the current document to synchronize the editing content to the documents.

SUMMARY

A method, apparatus and device for document update and a medium are provided according to the embodiments of the present disclosure, which realize synchronous update of documents with a reference relationship.

In a first aspect, a method for document update is provided according to the present disclosure. The method includes:
  receiving an editing operation on a target reference object in a first document, where the target reference object is a content block included in the first document;
  updating, in response to the editing operation, the target reference object in the first document; and
  sending update information to a server to allow the server to update the target reference object in a second document based on the update information; where, the update information includes a target reference object identifier and editing content; the second document is a document referencing the target reference object, or the second document is a source document of the target reference object.

In a second aspect, a method for document update is provided according to the present disclosure. The method includes:
  receiving, from a terminal, update information of a target reference object in a first document; where the update information includes a target reference object identifier and editing content, and the target reference object is a content block included in the first document; and
  updating, based on the update information, the target reference object in the second document; where the second document is a document referencing the target reference object, or the second document is a source document of the target reference object.

In a third aspect, an apparatus for document update is further provided according to the present disclosure. The apparatus includes:
  a first receiving module, configured to receive an editing operation on a target reference object in a first document; where the target reference object is a content block included in the first document;
  a first updating module, configured to update the target reference object in the first document, in response to the editing operation; and
  a second updating module, configured to send update information to a server to allow the server to update the target reference object in a second document based on the update information; where, the update information includes a target reference object identifier and editing content; the second document is a document referencing the target reference object, or the second document is a source document of the target reference object.

In a fourth aspect, an apparatus for document update is further provided according to the present disclosure. The apparatus includes:
  a first receiving module, configured to receive, from a terminal, update information of a target reference object in a first document; where the update information includes a target reference object identifier and editing content; the target reference object is a content block included in the first document; and
  an updating module, configured to update the target reference object in a second document based on the update information; where the second document is a document referencing the target reference object, or the second document is a source document of the target reference object.

In a fifth aspect, a document update device is further provided according to the present disclosure. The document update device includes:
  one or more processors; and
  a memory, configured to store one or more programs;
  where, the one or more programs, when executed by the one or more processors, cause the one or more processors to implement the method for document update according to any one of the above embodiment.

In a sixth aspect, a computer storage medium is further provided according to the present disclosure. The medium storing a computer program thereon, where the computer program, when executed by a processor, implements the method for document update according to any one of the above embodiment.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals represent the same or similar elements through the drawings. It should be understood that the drawings are schematic and the components and elements are unnecessarily drawn to scale.

FIG. 3 schematically illustrates display of an update source, update time, and update object for a target reference object according to an embodiment of the present disclosure;

FIG. 4 is a flowchart of a method for document update according to another embodiment of the present disclosure;

DETAILED DESCRIPTION OF EMBODIMENTS

Figure 1:
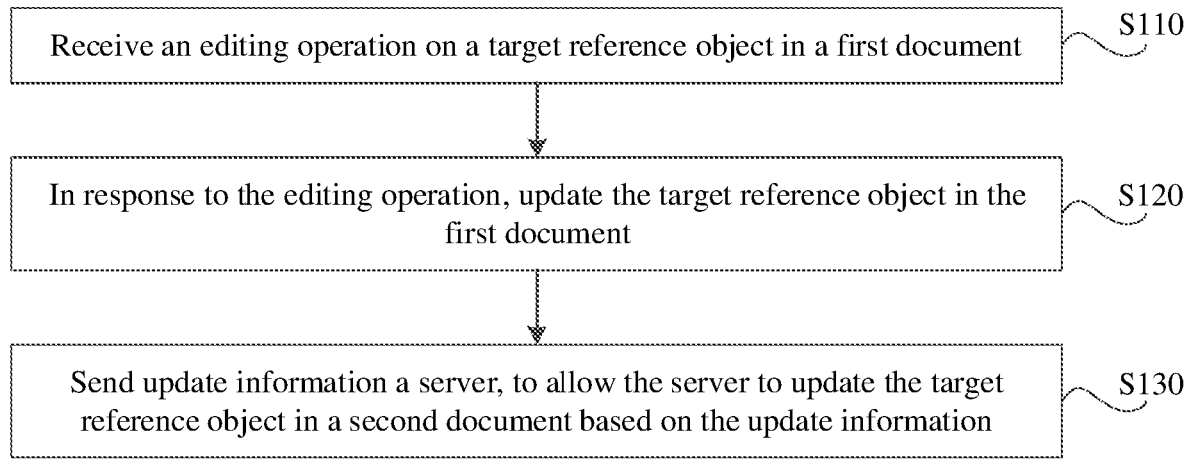
FIG. 1 is a flowchart of a method for document update according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. Rather, the embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, i.e., "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" used in the present disclosure are used to distinguish different apparatuses, modules or units, and are not used to limit a sequential order or interdependence of the functions performed by the apparatuses, modules or units.

It should be noted that the wordings such as "one" and "multiple" used in the present disclosure are illustrative and not restrictive. Those skilled in the art should understand that the wordings should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

FIG. 1 illustrates a flowchart of a method for document update according to an embodiment of the present disclosure. This embodiment is applicable to the case where documents are updated synchronously. This embodiment may be implemented by an apparatus for document update configured in a document update device. The document update device may be a terminal device, preferably a client device. As shown in FIG. 1, the method for document update according to the present disclosure includes steps S110 and S120 as follows.

In S110, an editing operation on a target reference object in a first document is received.

In an embodiment, the first document refers to an editable document displayed on a display interface of the document update device. During practical operation, the type of the currently displayed document is not limited. Exemplarily, the currently displayed document may be any editable document such as a Word document, a txt document, an Excel document, and a PDF document. The target reference object is a content block included in the first document. A content block is data with independently coordinating and recording capabilities. The definition of content block may be preset by online document software, or may be customized by users. For example, content blocks can be distinguished by content types, such as texts, pictures, tables and the like. The content blocks may alternatively be distinguished based on preset separators, such as a "carriage return", "paragraph separator", and "section break" and so on. The separation boundary of content blocks may also be set by user operations.

In an embodiment, an editing operation performed by the user on a target reference object in a first document is received. The editing operation may include one of a modifying operation, deleting operation, and adding operation. During the practical operation, the user can use different operation manners to perform editing operations on the target reference object in the first document, for example, the target reference object can be edited through mouse, shortcut key(s) or touch screen operation(s). Apparently, when the user uses different operation manners, the document update device receives the editing operation in different manners. Specifically, in a case that the user uses a touch screen operation to edit the target reference object, the document update device collects the action track(s) of the stylus or the finger of the user on the touch screen to determine the editing operation performed by the user on the target reference object; in a case that the user uses a mouse or shortcut keys to edit the target reference object, the document update device directly determines the editing operation performed by the user on the target reference object through the wired connection of the mouse or the wired connection of the keyboard. It is apparent that an editing operation performed by the user on a target reference object in a first document may be received in other manners, which is not limited herein.

In S120, in response to the editing operation, the target reference object in the first document is updated.

In an embodiment, after receiving the editing operation performed by the user on the target reference object, editing content for the target reference object is determined based on the editing operation. Then, the target reference object in the first document is updated based on the editing content. The editing content may be understood as the content to be updated the target reference object. Apparently, the editing contents corresponding to different editing operations are different from each other. For example, in a case that the editing operation is an adding operation, the editing content for the target reference object is the newly added content, which is irrelevant to the original substance of the target reference object. In a case that the editing operation is deletion and modification operation, the editing content for the target reference object is a part of the original substance of the target reference object.

In S130, update information is sent to a server to allow the server to update a target reference object in a second document based on the update information.

The update information includes a target reference object identifier and editing content; the second document is a document referencing the target reference object, or the second document is a source document of the target reference object.

In an embodiment, in order to accurately find the target reference object that needs to be updated in the second document, the update information sent to the server includes the target reference object identifier while including the editing content. The target reference object identifier is a unique identifier for representing the target reference object, i.e., different target reference objects have different target reference object identifiers. In order to distinguish target reference objects in different documents, an identifier capable of simultaneously distinguishing different documents and different target reference objects is used as the target reference object identifier. Exemplarily, the target reference object identifier may be a combination of a document identifier and a reference object identifier.

The update information is sent to the server, to allow the server to update the target reference object in a second document based on the update information. The second document may be a document referencing the target reference object, or may be a source document of the target reference object. In a case that the second document is a document referencing the target reference object, it can be understood that the first document is the source document of the target reference object. In this case, the reference relationship between the first document and the second document is that: the first document is referenced by the second document. In a case that the second document is the source document of the target reference object, it can be understood that the first document is the document referencing the target reference object. In this case, the reference relationship between the first document and the second document is that: the second document is referenced by the first document. It is apparent that the number of the second document may be one or more. In a case that the number of the second document is greater than one, the server pushes the update information to all the second documents associated with the first document, so that the second documents update the locally cached target reference object based on the update information.

In the technical solution of this embodiment, an editing operation on the target reference object in the first document is received; in response to the editing operation, the target reference object in the first document is updated; the update information is sent to the server to allow the server to update the target reference object in a second document based on the update information. Hence, it can avoid the complicated steps in the conventional technology where other documents that reference the current document have to re-reference the current document to synchronize the editing content to the documents if the target content in the current document is edited. It achieves the effect of simply and conveniently implementing bidirectional synchronous update of a target reference object in a second document that has a reference relationship with a first document.

In an embodiment, before updating the target reference object in the second document, the method further includes: displaying an update control on the interface of the second document, where the update control is used to update the target reference object referenced in the second document. The update control refers to a pop-up option on the interface of the second document for confirming whether to update the second document or not. It can be understood that when the substance of the target reference object in the first document is updated, the second document associated with the first document also needs to be updated synchronously, that is, the server sends update information to the second document to allow the second document to update the target reference object corresponding to the target reference object identifier in the update information. However, in the practical operation process, the user of the client device corresponding to the second document may retain the original substance of the second document, i.e., does not update the substance of the target reference object. In order to improve the user experience, before the target reference object in the second document is updated, an update control pops up on the interface of the second document to access the usage requirements of the user.

Figure 2:
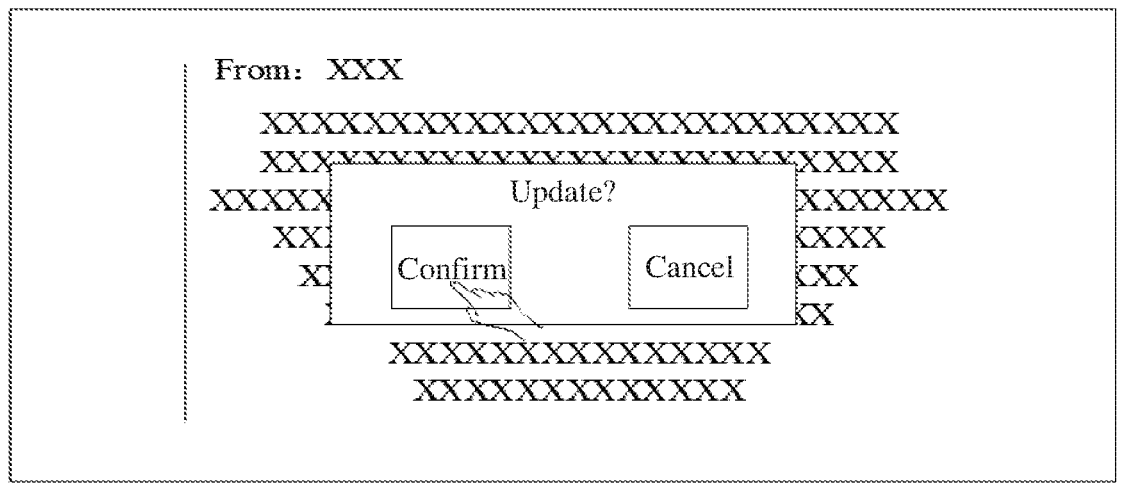
FIG. 2 schematically illustrates display of an update control according to an embodiment of the present disclosure.

Exemplarily, FIG. 2 schematically illustrates display of an update control according to an embodiment of the present disclosure. As shown in FIG. 2, expressions like "Confirm to update?" "Confirm" and "Cancel" are included in the update control. When the user clicks the "Confirm" option, the target reference object in the second document is updated based on the update information. When the user clicks the "Cancel" option, the updating of the target reference object in the second document is cancelled. In order not to affect the display of the second document while the update control pops up, the interface where the update control is located accounts for a certain proportion (for example, less than 20%) of the interface of the second document.

In an embodiment, updating the target reference object in the second document includes: adding an update source and/or update time for the target reference object in the second document. The update source includes information of the first document.

In an embodiment, the latest update information is displayed at the reference position of the target reference object in the second document. Exemplarily, the latest update information may include: update source and/or update time. The update source refers to the information of the document that triggers the update of the target reference object in the second document. Exemplarily, the update source may include the information of the first document, i.e., when the target reference object in the first document is updated, correspondingly, the target reference object in the second document associated with the first document is also updated. The information of the first document may include: the name of the first document and/or the identifier of the first document. The update time is used to display the latest update time at the reference position of the target reference object in the second document, i.e., to remind the user of the specific time when the last update of the target reference object occurs. In order to enable the user to clearly understand the operating user who causes the update of the target reference object, an update object may be added for the target reference object in the second document.

It should be noted that the update of the target reference objects in the first document and the second document is in real-time. In other words, when the substance of the target reference object in the first document is updated, the server pushes the update information to the second document to update the target reference object in a second document. In the practical operation process, when the update is delayed due to external factors such as network interruption and network delay, the user of the second document can achieve the updating by refreshing the interface.

Exemplarily, FIG. 3 schematically illustrates display of an update source, update time, and update object of a target reference object according to an embodiment of the present disclosure. As shown in FIG. 3, it is assumed that the first document is document B and the second document is document A. When the target reference object in document B is updated, the client device where document B is located sends the update information to the server to allow the server to update the target reference object in document A based on the update information. Exemplarily, in order to facilitate the user to view the latest update information of the target reference object in document A more intuitively, the update source (Document B), the update time (Last update is performed on Jan. 16, 2021) and the update object (User A) may be displayed above the target reference object date. In other words, it indicates that the user A updates the target reference object in document B on Jan. 16, 2021.

FIG. 4 is a flowchart of a method for document update according to another embodiment of the present disclosure. This embodiment is based on the above embodiments and further describes the method for document update. As shown in FIG. 4, the method for document update in this embodiment includes steps S210 to S250 as follows.

In S210, in response to a reference operation on a target reference object in a second document, the target reference object and/or association information of the target reference object are acquired.

The reference operation refers to an editing operation on the target reference object in the second document. Exemplarily, the reference operation may include: a copying operation on the target reference object, a selection operation on the target reference object, and the like. In the practical operation process, the user may perform reference operations on the target reference object in different manners, for example, may perform reference operations through shortcut keys, or may perform reference operations through options in a selection box on the document display interface, or may perform reference operations directly through the mouse, which is not limited here. The association information of the target reference object includes: the reference source of the target reference object and the position information of the target reference object in the source document. In an embodiment, the reference source of the target reference object refers to the source document corresponding to the document where the target reference object is located. Exemplarily, assuming that the second document is a document referencing the target reference object, the reference source of the target reference object in the second document is the first document. In an embodiment, after receiving the reference operation performed by the user on the target reference object in the second document, when the target reference object is selected, association information of the target reference object is also selected.

In S220, the target reference object and/or association information of the target reference object are rendered to the first document.

In an embodiment, after the target reference object and/or the association information of the target reference object are acquired from the second document, the target reference object and/or the association information of the target reference object are rendered to the first document.

Specifically, S220 includes S2201-S2203:

In S2201, in response to receive a triggering operation performed by a user on the target reference object in the first document, a first interaction area is displayed.

The first interaction area is used to carry and display reference manner options for the target reference object. In the embodiment, after receiving the triggering operation performed by the user on the target reference object in the first document, the first interaction area pops up in the display interface of the first document and displays all reference manner options corresponding to the target reference object for the user to select one of the reference manner options according to the actual situation. The triggering operation on the target reference object may include a clicking operation on the target reference object, or a pasting operation on the target reference object.

In an embodiment, the reference manner corresponding to the reference manner option includes one of real-time reference and non-real-time reference. It should be noted that, in a case that the reference manner is real-time reference, when the target reference object in the first document is updated, the target reference object in the second document that has a reference relationship with the first document is also updated synchronously. In a case that the reference manner is non-real-time reference, when the target reference object in the first document is updated, the synchronous update of the target reference object in the second document that has a reference relationship with the first document is abandoned, i.e., it is equivalent to selecting the paste operation on the target reference object in the second document.

In S2202, a selection operation performed by the user on one of the reference manner options in the first interaction area is received.

In the embodiment, after the first interaction area pops up in the currently displayed document, the user clicks one of the reference manner options in the first interaction area according to the requirements of the user. By highlighting the reference manner option clicked by the user, it can distinguish the reference manner option selected by the user from the unselected reference manner options. The selection operation refers to an operation that the user selects a reference manner option. Exemplarily, the selection operation may include: a clicking operation, a switching operation or the like. For example, in the practical operation process, the user may switch among the reference manner options through the arrow keys (for example, up, down, left or right) in the keyboard. The user may alternatively move the cursor to the reference manner option to be selected by the user via the mouse and use the mouse to click the reference manner corresponding to the reference method option.

In S2203, the target reference object is rendered to the first document in a reference effect corresponding to the reference manner option.

In an embodiment, after receiving the clicking operation performed by the user on one of the reference manner options in the first interaction area, the reference effect of the target reference object in the reference manner corresponding to the reference manner option is displayed in the currently displayed document; and then the target reference object is rendered to the first document based on the reference effect. While rendering the target reference object to the first document, the association information of the target reference object may also be rendered to the first document.

Figure 5:
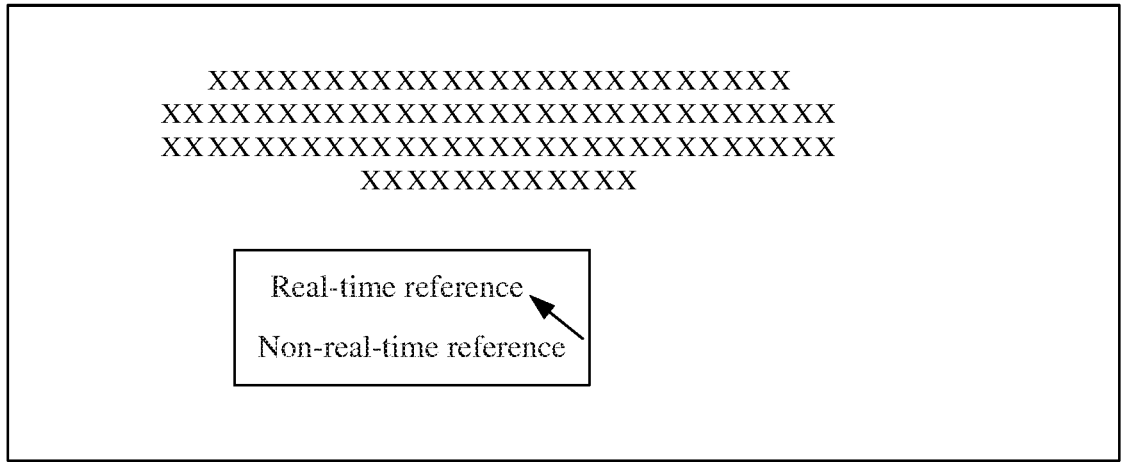
FIG. 5 schematically illustrates display of a first interaction area according to an embodiment of the present disclosure.

Exemplarily, FIG. 5 schematically illustrates display of a first interaction area according to an embodiment of the present disclosure. As shown in FIG. 5, after the target reference object is pasted into the first document, a first interaction area including the real-time reference option and the non-real-time reference option pops up in the first document. As shown in FIG. 5, the user clicks the real-time reference option in the first interaction area with the mouse, so that the target reference object in the second document associated with the first document is updated synchronously with the update of the target reference object in the first document.

In the embodiment, in the first document, the target reference object is presented in a special form to indicate that it is not the original content in the first document but rather is referenced from other documents (e.g., the second document). In addition, the reference source of the target reference object may be displayed.

Figure 6:
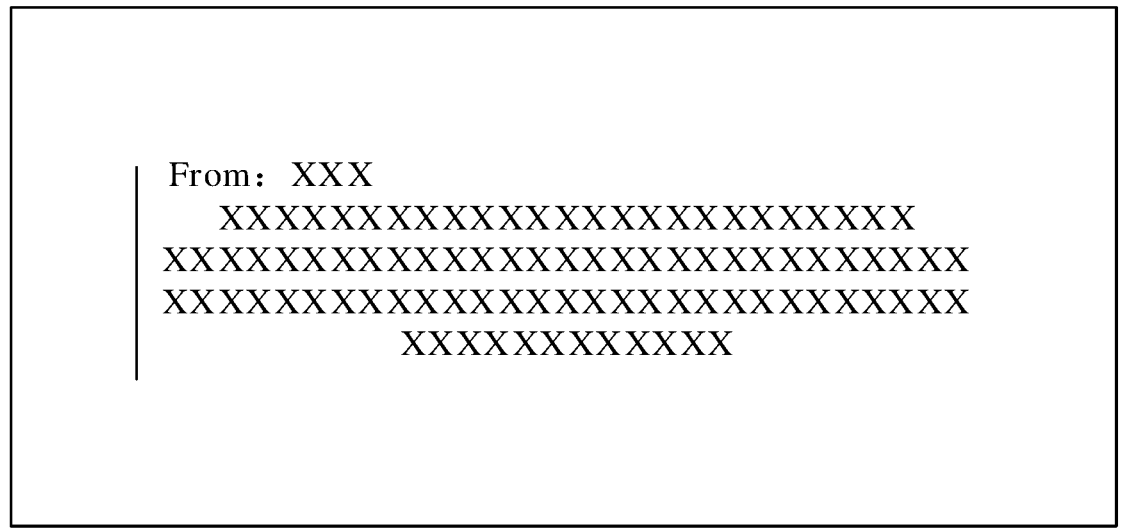
FIG. 6 schematically illustrates display of a target reference object according to an embodiment of the present disclosure.

Exemplarily, FIG. 6 schematically illustrates display of a target reference object according to an embodiment of the present disclosure. As shown in FIG. 6, the target reference object is presented as the reference content (i.e., not the original content in the first document) by means of the left vertical line. In addition, "From XXX" is displayed above the target reference object as the reference source of the target reference object, so that the user can visually view the reference source of the target reference object.

In S230, an editing operation on the target reference object in the first document is received.

The target reference object is a content block included in the first document.

In S240, in response to the editing operation, the target reference object in the first document is updated.

In S250, the update information is sent to the server, to allow the server to update the target reference object in the second document based on the update information.

The update information includes target reference object identifier and editing content; the second document is a document referencing the target reference object, or the second document is a source document of the target reference object.

Figure 7:
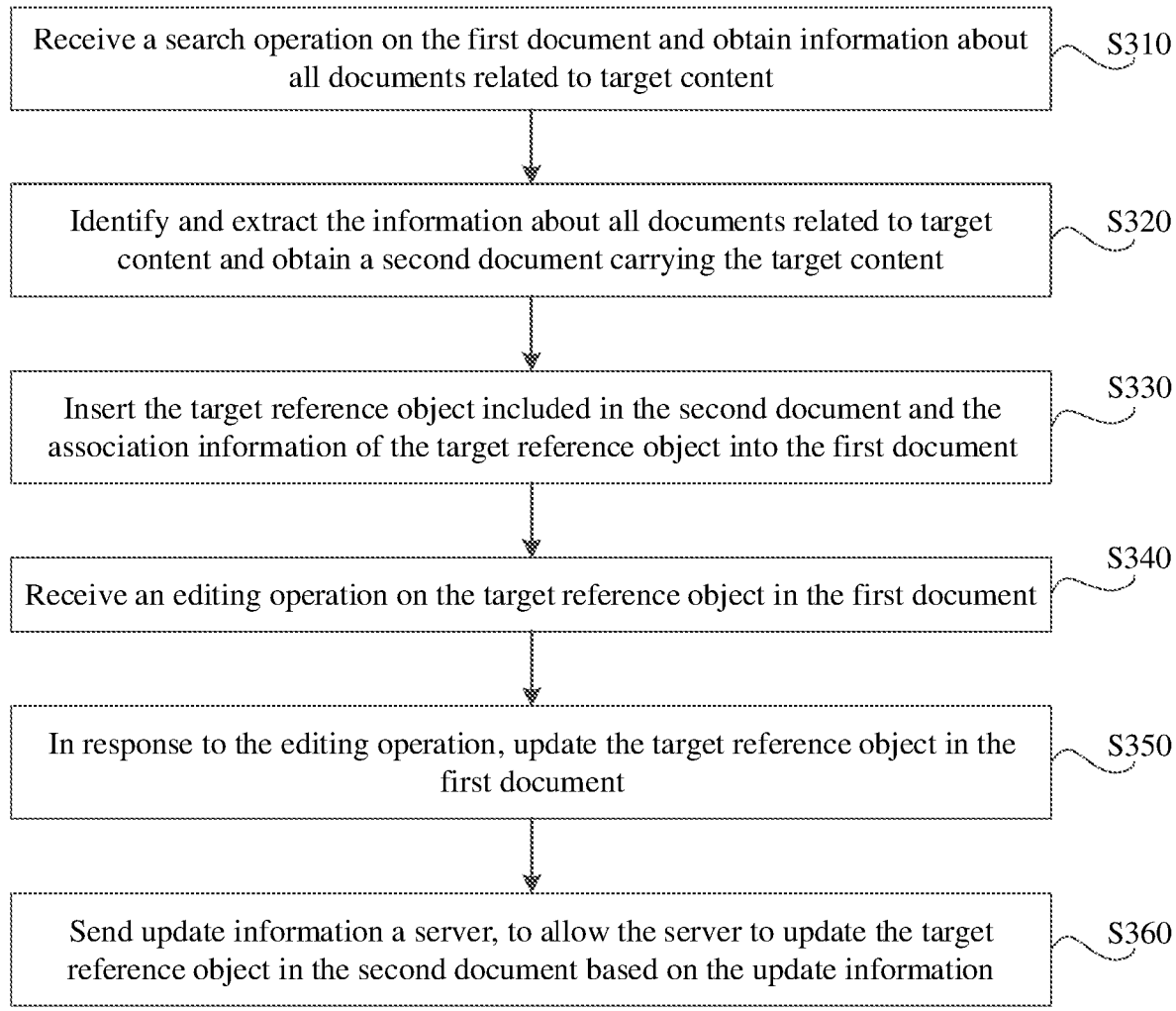
FIG. 7 is a flowchart of a method for document update according to yet another embodiment of the present disclosure.

FIG. 7 is a flowchart of a method for document update according to yet another embodiment of the present disclosure. This embodiment is based on the above embodiments and further describes the method for document update. As shown in FIG. 7, the method for document update in this embodiment includes steps S310 to 360.

In S310, a search operation on the first document is received and information about all documents related to target content is obtained.

The search operation refers to a search operation performed in the first document for the target content. In an embodiment, in the search box in the first document, the tag information of the target content (e.g., it may be a keyword of the target content, a title of the target content, etc.) is inputted. Then, information about all documents related to the target content can be obtained by clicking search. The information about documents may include: document identifiers and/or document names. It can be understood that information about all documents related to the target content is displayed on the display interface above the first document for users to view. It should be noted that the target content is not included in the documents related to the target content.

In S320, the information about documents is identified and extracted, and a second document carrying the target content is obtained.

In an embodiment, information about all documents related to the target content is identified and extracted, and a second document carrying the target content is found. The second document carrying the target content refers to that the target content is included in the second document.

In S330, the target reference object in the second document and the association information of the target reference object are inserted into the first document.

It should be noted that, for an explanation of the target reference object and the association information of the target reference object, reference may be made to the description in the foregoing embodiments, which will not be repeated here. After the second document carrying the target content is acquired, the target content is inserted into the first document as a target reference object, and at the same time association information of the target reference object is acquired and inserted into the first document.

The target reference object carries the target content.

In S340, an editing operation on the target reference object in the first document is received.

The target reference object is a content block included in the first document.

In S350, in response to the editing operation, the target reference object in the first document is updated.

In S360, the update information is sent to the server to allow the server to update the target reference object in the second document based on the update information.

The update information includes the target reference object identifier and editing content; the second document is a document referencing the target reference object, or the second document is a source document of the target reference object.

In the technical solution in this embodiment, on the basis of the foregoing embodiments, when the target reference object in the first document is updated, the editing content of the target reference object (i.e., the update information) is obtained by searching the target content in the first document. Subsequently, the update information of the target reference object is inserted into the second document, which realizes the real-time update of the target reference object in the first document and the second document.

Figure 8:
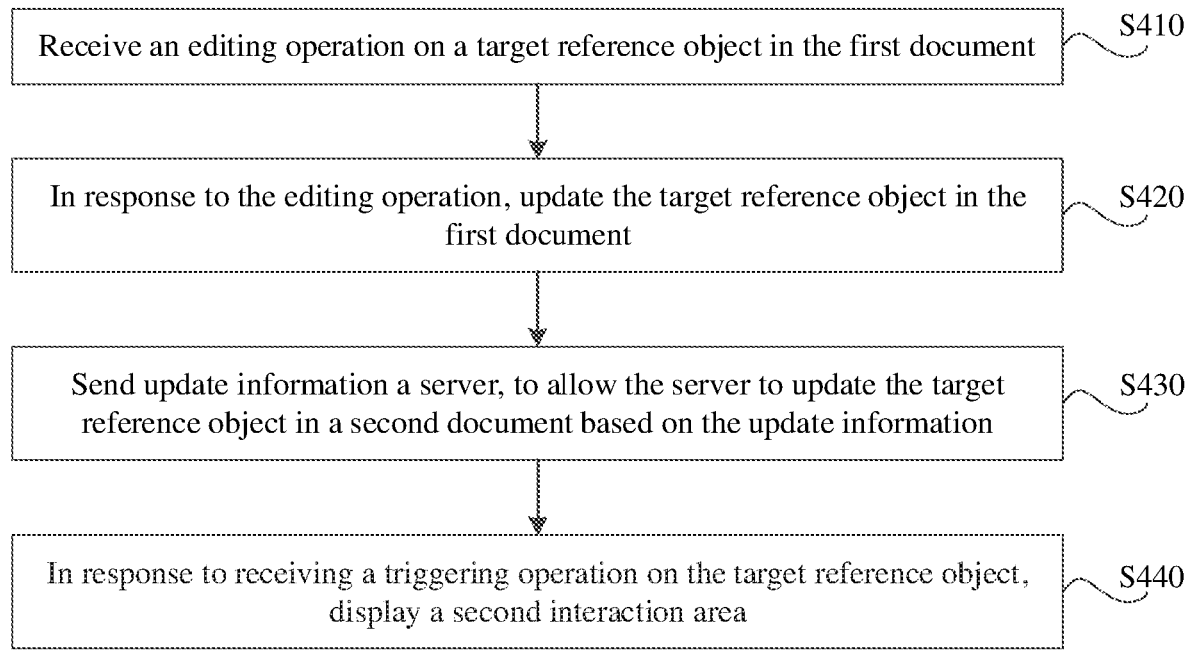
FIG. 8 is a flowchart of a method for document update according to still another embodiment of the present disclosure.

FIG. 8 is a flowchart of a method for document update according to still another embodiment of the present disclosure. This embodiment is based on the above embodiments and further describes the method for document update. As shown in FIG. 8, the method for document update in this embodiment includes steps S410 to S440 as follows.

In S410, an editing operation on a target reference object in a first document is received.

The target reference object is a content block included in the first document.

In S420, in response to the editing operation, the target reference object in the first document is updated.

In S430, the update information is sent to a server to allow a server to update a target reference object in a second document based on the update information.

The update information includes a target reference object identifier and editing content; the second document is a document referencing the target reference object, or the second document is a source document of the target reference object.

In S440, in response to receiving a triggering operation on the target reference object, a second interaction area is displayed.

Figure 9:
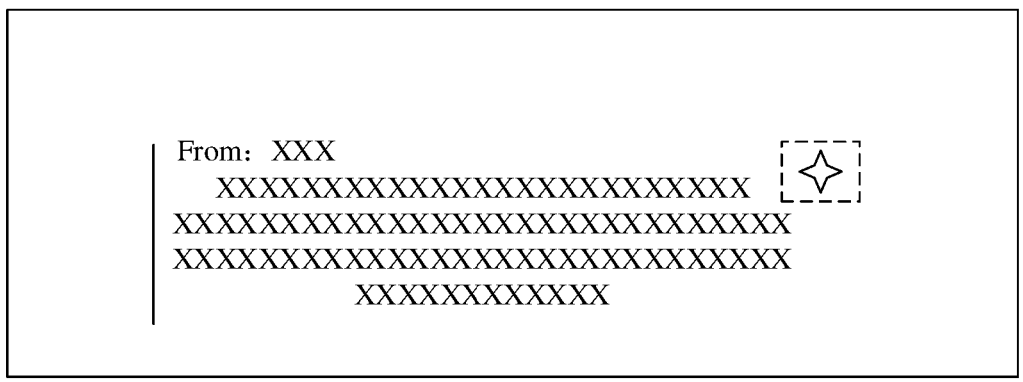
FIG. 9 schematically illustrates display of a link button according to an embodiment of the present disclosure.

The second interaction area is used to display the reference information of the target reference object. In an embodiment, in the first document, if the user focuses the mouse cursor on the target reference object, a link button is presented in the first document to indicate that the target reference object has a reference relationship. FIG. 9 schematically illustrates display of a link button according to an embodiment of the present disclosure. As shown in FIG. 9, there is a dotted frame in the upper right corner of the target reference object, in which a four-pointed star is contained. It can be understood that the dotted frame is the area where the link button is located and the four-pointed star inside it is the link button. It should be noted here that, during practical operation, the area where the link button is located may not be marked with a dotted frame.

In one embodiment, displaying the second interaction area includes: acquiring all reference documents that reference the target reference object and total referenced times; prioritizing, based on a preset priority sorting criterion, the reference documents; and displaying, in the second interaction area, document information of the reference documents and the total referenced times in sequence.

In an embodiment, the document information includes one of reference document name and reference document identifier.

In an embodiment, the reference document refers to a document associated with the target reference object. Apparently, the reference document can also be called a source document or a referenced document. In a practical operation process, there may be one or more reference documents for each target reference object, which is not limited. In an embodiment, all reference documents of the target reference object may be acquired from a server or a local database. It can be understood that, when the application software where the first document is located is online, all reference documents of the target reference object in the first document may be acquired directly from the server; when the application software where the first document is located is offline, all reference documents of the target reference object in the first document may be acquired directly from the local database.

In an embodiment, in order to facilitate the management of reference documents and facilitate the user to understand all reference documents of the target referenced object quickly and intuitively, all reference documents may be prioritized based on a preset priority sorting criterion. In one embodiment, the preset priority sorting criterion includes one of reference date and referenced times. The reference date refers to the update date of the reference document corresponding to the target reference object; referenced times may refer to the total number of times that the reference document corresponding to the target reference object is referenced by other documents. It can be understood that in a case that the reference documents are prioritized based on reference dates, it is equivalent to prioritizing based on the update time of the reference documents, that is, the latest updated reference document is at the top of all reference documents (i.e., at the first). In a case that the reference documents are prioritized based on the referenced times, the document with the most referenced times may be placed at the top of all reference documents (i.e., at the first).

In an embodiment, the reference document identifier refers to a unique identifier of a document, which is similar to an ID number of a user. In an embodiment, in order to understand the information of the reference document more quickly and intuitively, the reference document name and reference document identifier of the reference document may be displayed in the second interaction area. In the practical operation process, the reference documents may have the same document name. In order to distinguish the reference documents, the reference document identifiers may be used to distinguish them.

Figure 10:
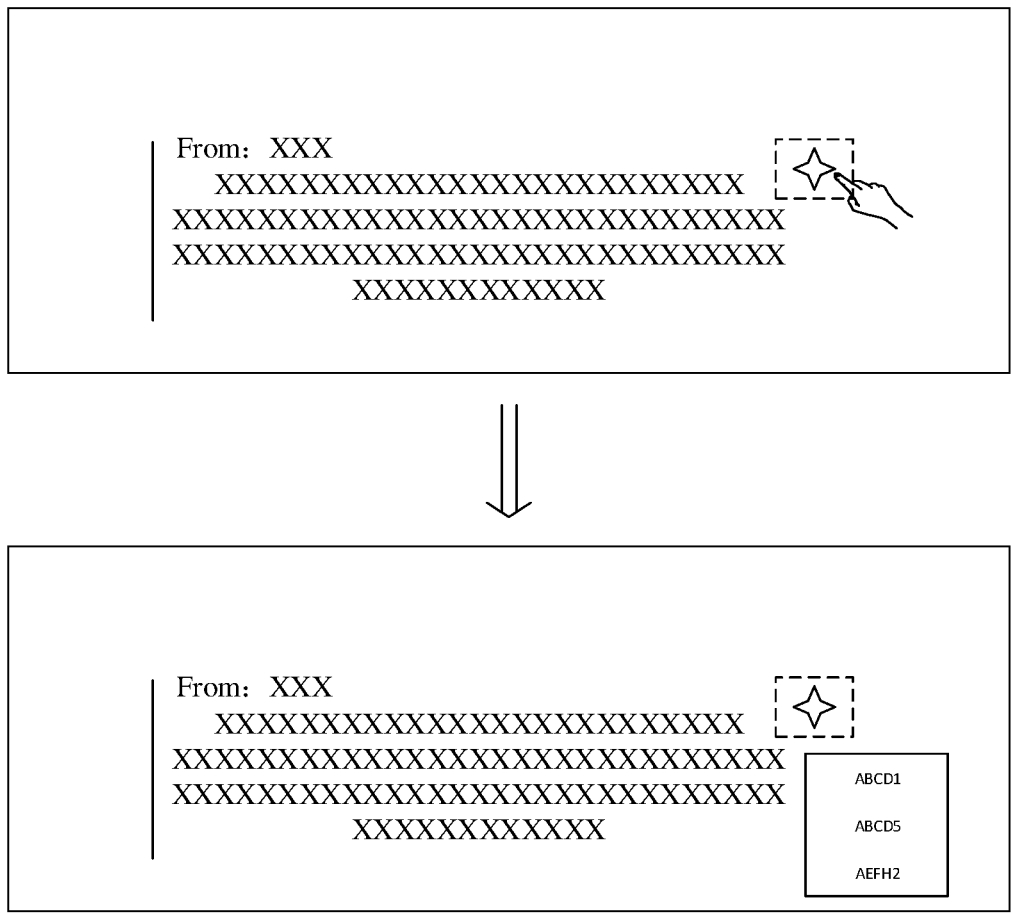
FIG. 10 schematically illustrates display of a second interaction area according to an embodiment of the present disclosure.

Exemplarily, when the user clicks the link button, in the second interaction area, the reference relationship of the target reference object is displayed in a pop-up window. Exemplarily, FIG. 10 schematically illustrates display of a second interaction area according to an embodiment of the present disclosure. As shown in FIG. 10, there is a dotted frame in the upper right corner of the target reference object, and the user operates the link button by mouse or touch to pop up a second interaction area containing the reference relationship corresponding to the target reference object. Exemplarily, three reference documents are included in the second interaction area, i.e., there are three reference documents corresponding to the target reference object, namely ABCD1, ABCD5 and AEFH2. The document names of the first reference document and the second reference document are the same. In this case, the document identifiers may be used to distinguish the documents, i.e., the document identifier of the first reference document is 1, and the document identifier of the second reference document is 5.

In the technical solution of the embodiment of the present disclosure, the reference relationship of the target reference object is displayed through the second interaction area, and the historical reference information of the target reference object is displayed through the second interaction area, so that the user can more intuitively understand the historical reference information, reference source and reference relationship of the target reference object in the currently displayed document, to improve the convenience in use.

Figure 11:
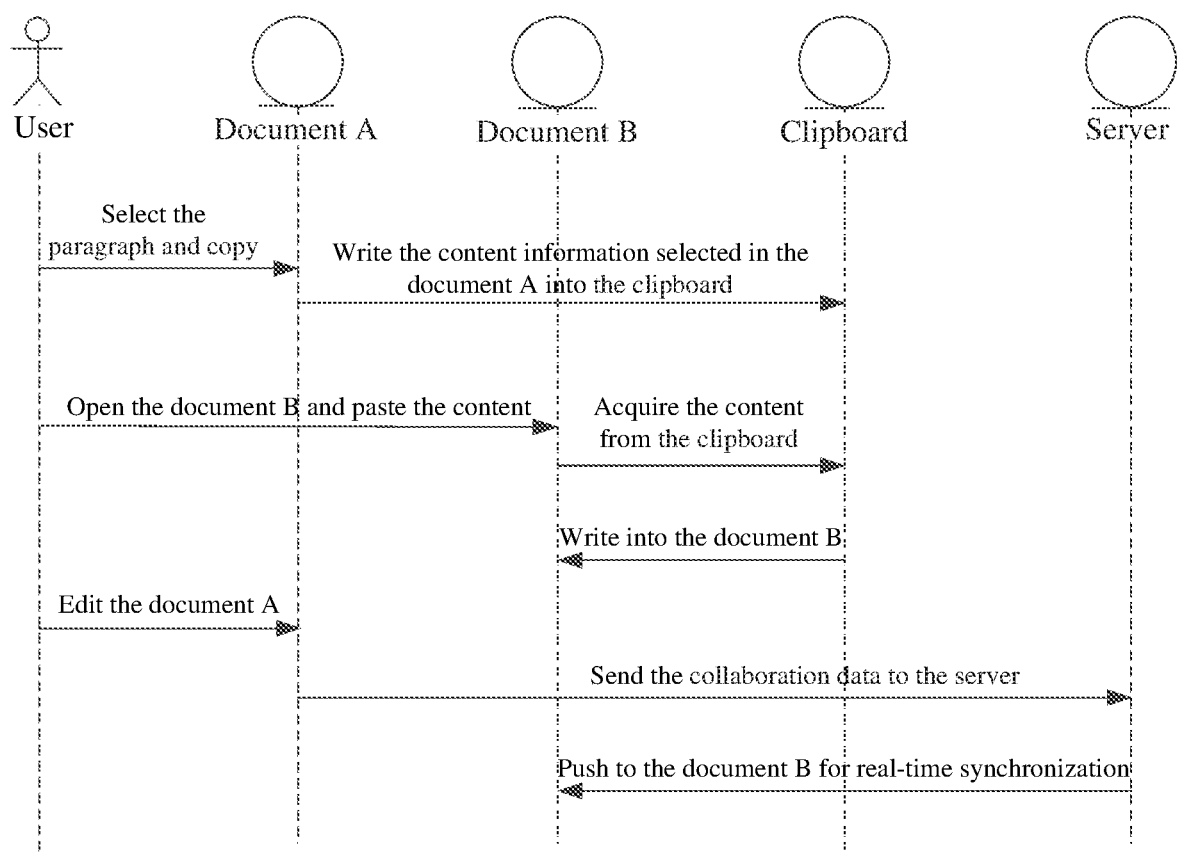
FIG. 11 is a flow chart of creating bidirectional update permissions according to an embodiment of the present disclosure.

FIG. 11 is a flow chart of creating bidirectional update permissions according to an embodiment of the present disclosure. In this embodiment, as an example to describe the creation process of the bidirectional update permissions, the real-time reference is implemented by copying and pasting. As shown in FIG. 11, the creation process in this embodiment includes the following steps.

In S1, when the user copies the paragraph content from document A, the system corresponding to document A writes the relevant information of the selected content of document A (i.e., the target reference object in the above embodiments) into the browser clipboard. And, the source document of the to-be-pasted content and the position information of the to-be-pasted content in the source document are clearly described in the relevant information of the content.

In S2, when performing a pasting operation in document B, the relevant content of the to-be-pasted paragraph is read from the clipboard, and the key information of real-time reference is parsed out, to be written into document B.

In S3, when editing, in the document A or document B, a part of the real-time reference content, an editing instruction is sent to the server. After receiving the editing instruction, the server pushes the editing content to the source document and the reference document to achieve the purpose of collaboration.

In the embodiment, in a case that the paragraph content is copied from document A to the browser clipboard and the paragraph content copied from document A is pasted in the document B, two function buttons appear on the display interface of document B (i.e., the reference manner options described in the above embodiment), including: real-time reference button and non-real-time reference button. When the user does not operate or selects the non-real-time reference button, the text is directly pasted, that is, when the paragraph content is updated in the document A, the paragraph content will not be updated in the document B; when the paragraph content is updated in the document B, the paragraph content will not be updated in the document A. When the user selects the real-time reference button, the pasted text will be provided with a vertical line indicating reference, i.e., the vertical line on the left side as shown in FIG. 2, and with the reference source "From document B", that is, when the paragraph content is updated in the document A, the paragraph content is updated in the document B; when the paragraph content is updated in the document B, the paragraph content is updated in the document A.

Figure 12:
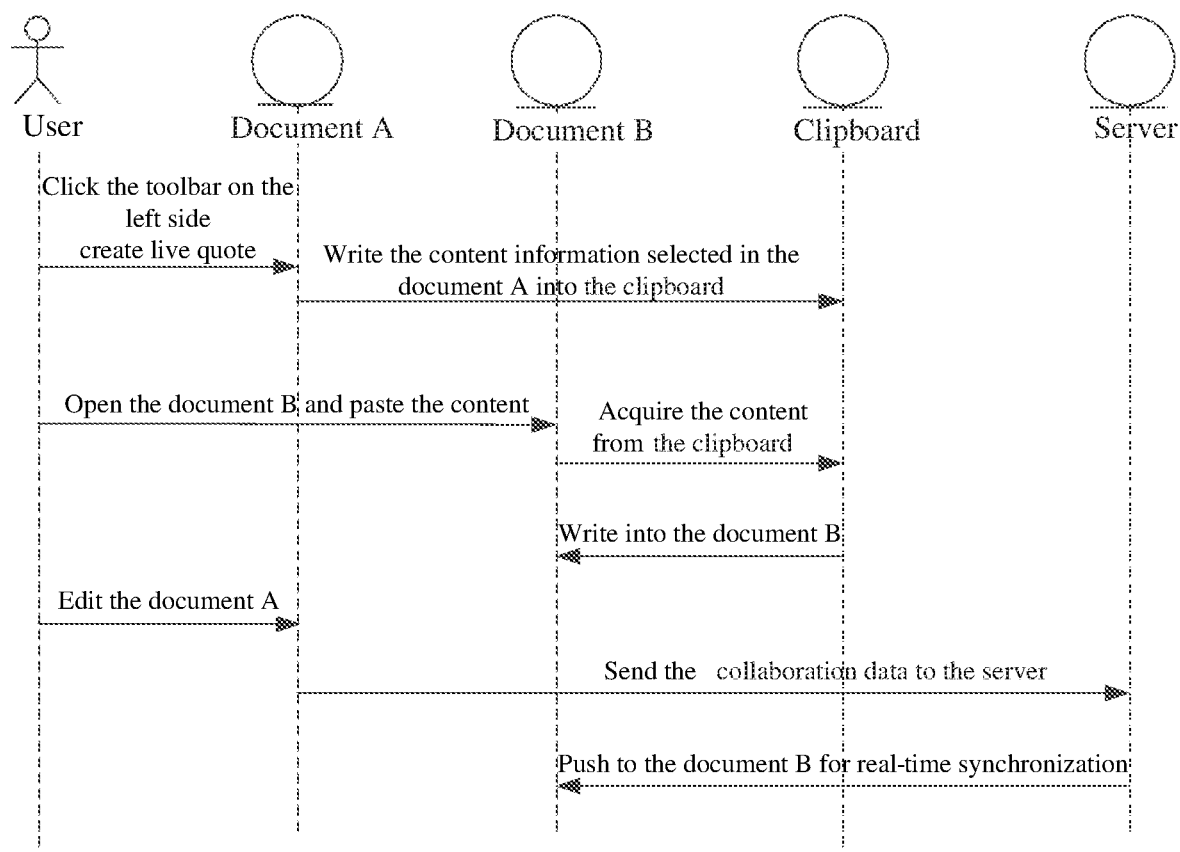
FIG. 12 is a flow chart of creating bidirectional update permissions according to another embodiment of the present disclosure.

FIG. 12 is a flow chart of creating bidirectional update permissions according to another embodiment of the present disclosure. In this embodiment, as an example to describe the creation process of the bidirectional update permissions, the real-time reference is implemented by creating a "real-time reference" function. As shown in FIG. 12, the creation process in this embodiment includes the following steps.

In S1, in the document A, when the user clicks to create "real-time reference", the system writes the relevant information of the selected content (i.e., the target reference object in the above embodiment) of document A into the browser clipboard. The document source of the to-be-pasted content and the position information of the to-be-pasted content in the source document are clearly described in the content.

In S2, when performing a pasting operation in document B, the relevant content of the to-be-pasted paragraph is read from the clipboard, and the key information of real-time reference is parsed out, to be written into document B.

In S3, when editing, in the document A or document B, a part of the real-time reference content, an editing instruction is sent to the server. After receiving the editing instruction, the server pushes the editing content to the source document and the reference document to achieve the purpose of collaboration.

In the embodiment, by selecting the entire target reference object in the toolbar of document A (e.g., the toolbar that will appear when clicking and dragging the button), and clicking the "Create real-time reference" button on the tool panel that appears, a real-time reference is created successfully. Subsequently, the real-time reference content created from document A is pasted (ctrl+v) in the document B. The pasted text is provided with a vertical line indicating reference and with the source "From document A". In this way, when this part of the content is updated in the document A, synchronous update is implemented in the document B; when this part of the content is updated in the document B, synchronous update is implemented in the document A.

Figure 13:
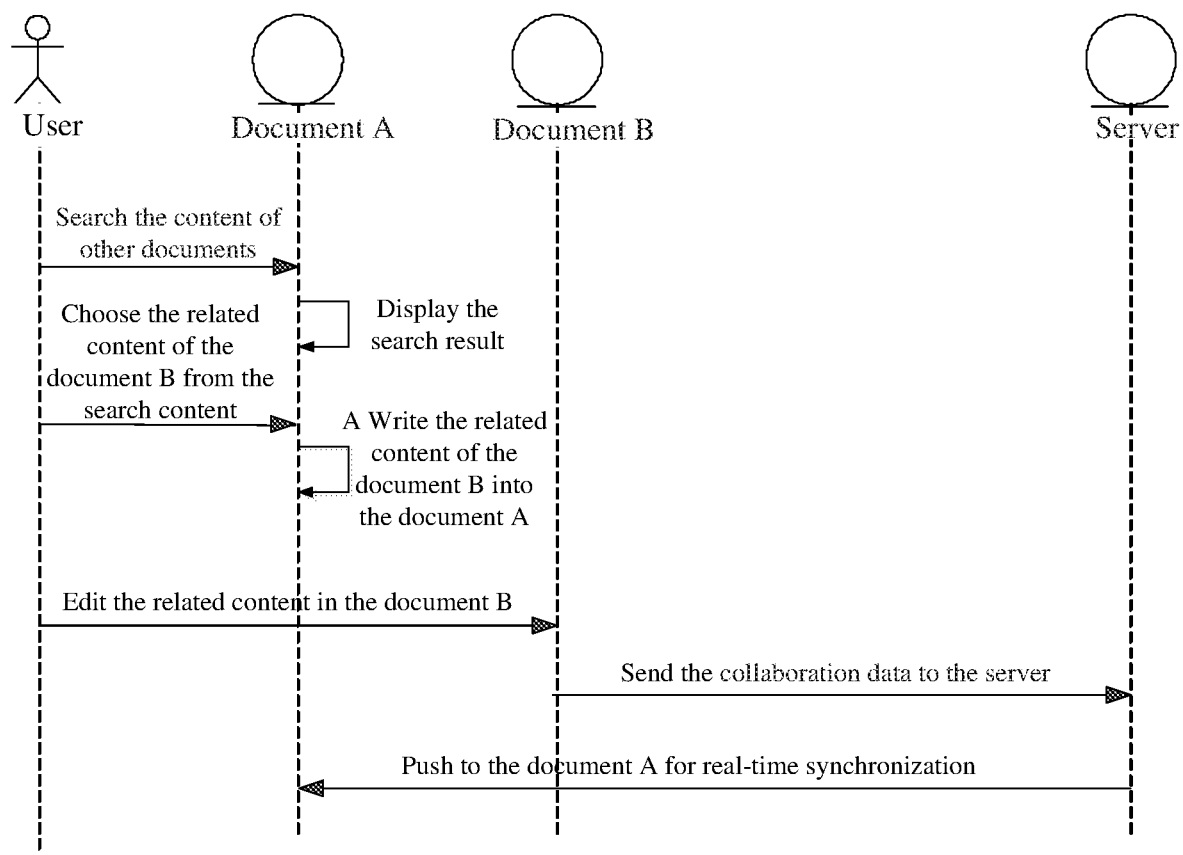
FIG. 13 is a flow chart of creating bidirectional update permissions according to yet another embodiment of the present disclosure.

FIG. 13 is a flow chart of creating bidirectional update permissions according to yet another embodiment of the present disclosure. In this embodiment, as an example to describe the creation process of the bidirectional update permissions, the real-time reference is implemented by searching and inserting. As shown in FIG. 13, the creation process in this embodiment includes the following steps.

In S1, a search operation is performed in the document A, where document information related to the search content is returned in a search list.

In S2, the content of document B is selected and inserted into the document A; in the document A, the key information of reference document B is described, including the source of the reference content and the position information of the reference content in the source document.

In S3, in the document A or document B, a part of the real-time reference content (i.e., the target reference object in the above embodiment) is edited, an editing instruction is pushed to the server. The server simultaneously pushes editing instructions to other client devices to achieve the purpose of collaboration.

Figure 14:
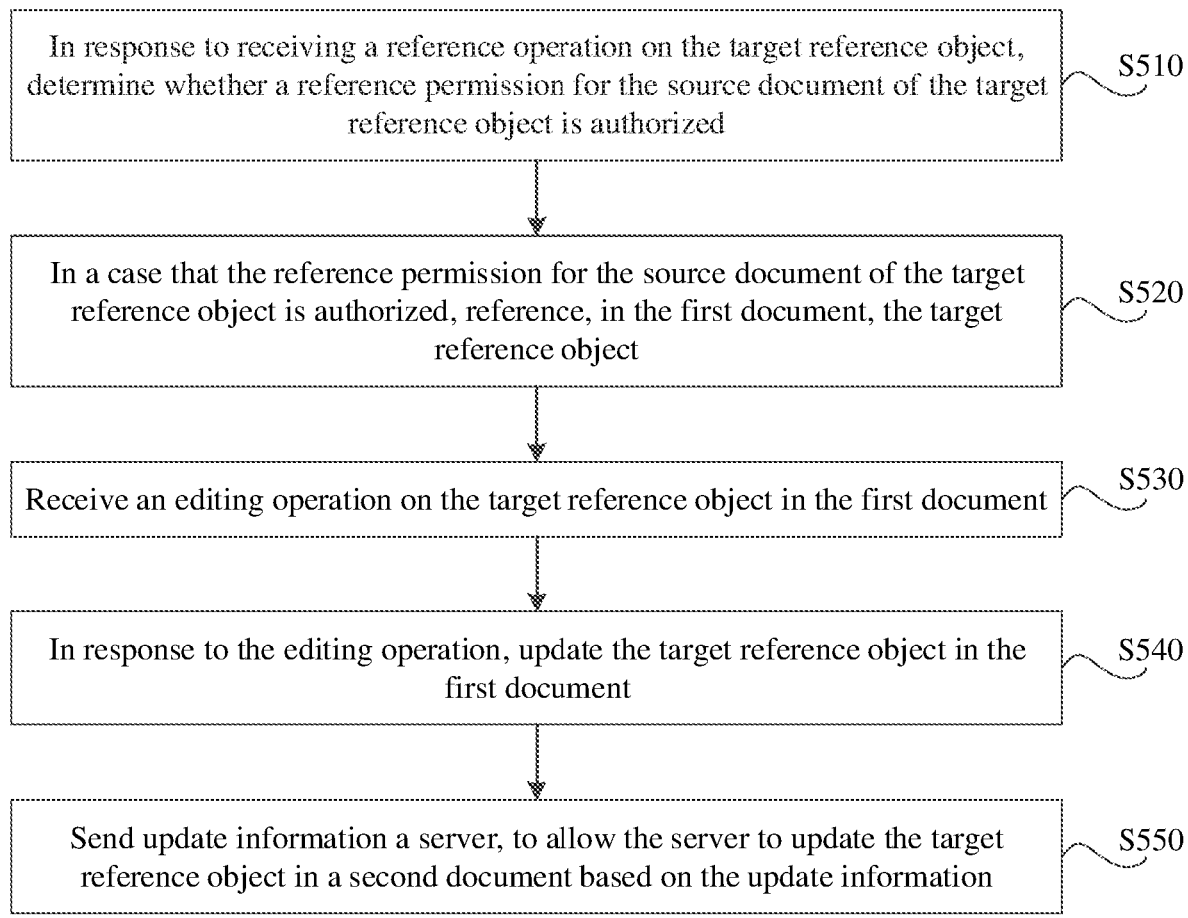
FIG. 14 is a flowchart of a method for document update according to still another embodiment of the present disclosure.

FIG. 14 is a flowchart of a method for document update according to still another embodiment of the present disclosure. This embodiment is based on the above embodiments and further describes the method for document update. As shown in FIG. 14, the method for document update in this embodiment includes steps S510 to S550 as follows.

In S510, in response to receiving a reference operation on the target reference object, it is determined whether reference permission for the source document of the target reference object is authorized.

In an embodiment, when it is detected that a reference operation is performed on the target reference object, it is determined whether the user has the reference permission with respect to the source document of the target reference object. The reference permission can be understood as whether the user has the permission to read or share the source document of the target reference object.

In S520, in a case that the reference permission for the source document of the target reference object is authorized, the target reference object is referenced in the first document.

In an embodiment, in a case that the user has the reference permission for the source document of the target reference object, i.e., the user is allowed to read or share the source document of the target reference object, then the target reference object can be referenced to the first document. In contrast, when the user does not have the reference permission for the source document of the target reference object, it is not allowed to reference the target reference object in the first document. In addition, an instruction box may pop up for applying permission from the owner of the source document of the target reference object. In this way, in a case that the user cannot reference the target reference object, the user can be intuitively informed of the reason why the user cannot reference, thereby effectively improving the user experience.

In S530, an editing operation on the target reference object in the first document is received.

The target reference object is a content block included in the first document.

In S540, in response to the editing operation, the target reference object in the first document is updated.

In S550, the update information is sent to the server to allow the server to update the target reference object in the second document based on the update information.

The update information includes target reference object identifier and editing content; the second document is a document referencing the target reference object, or the second document is a source document of the target reference object.

Figure 15:
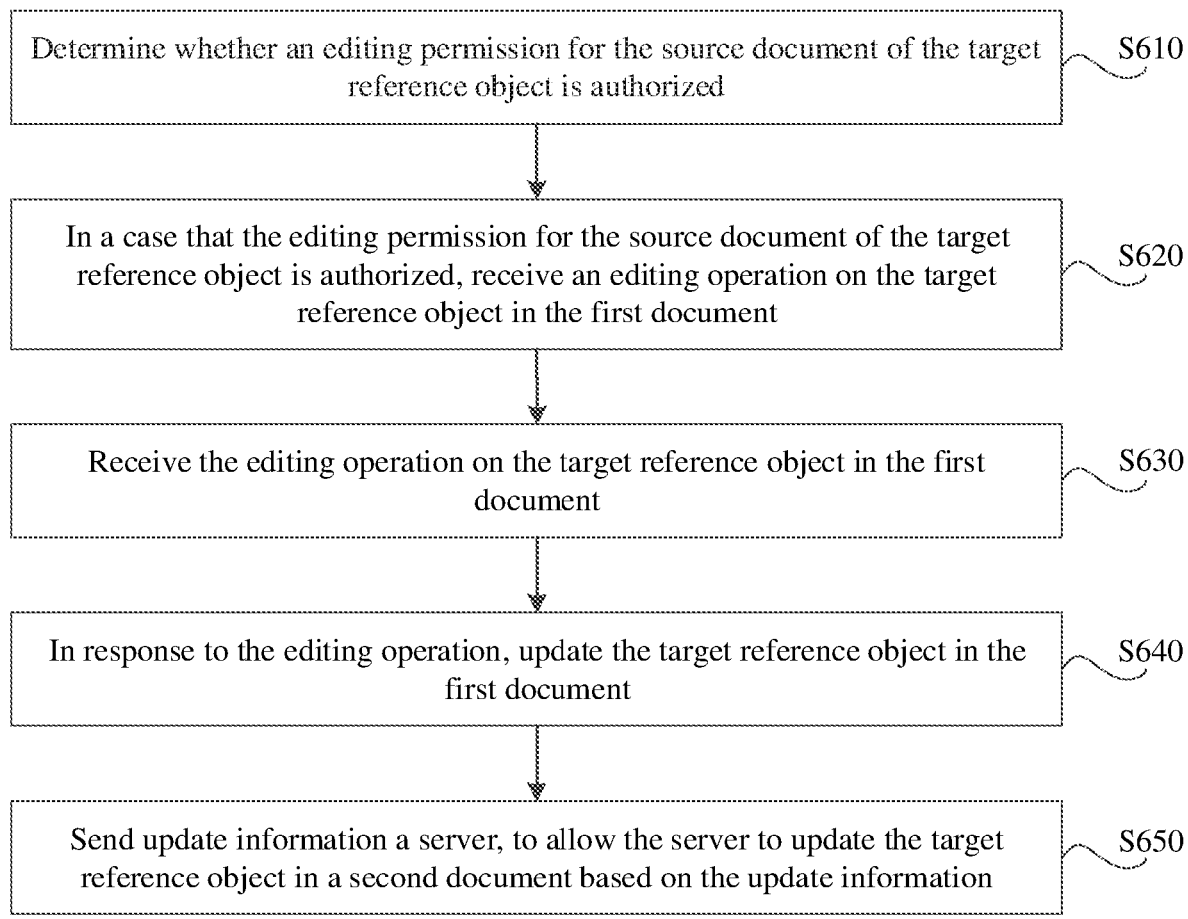
FIG. 15 is a flowchart of a method for document update according to still another embodiment of the present disclosure.

FIG. 15 is a flowchart of a method for document update according to still another embodiment of the present disclosure. This embodiment is based on the above embodiments and further describes the method for document update. As shown in FIG. 15, the method for document update in this embodiment includes steps S610 to S650 as follows.

In S610, it is determined whether an editing permission for the source document of the target reference object is authorized.

In the embodiment, the process of determining whether an editing permission for the source document of the target reference object is authorized can be understood as a process of determining whether the modification permission for the source document of the target reference object is authorized.

In S620, in a case that the editing permission for the source document of the target reference object is authorized, an editing operation on the target reference object in the first document is received.

In an embodiment, in a case that the user has editing permission for the source document of the target reference object, that is, the user is allowed to edit the source document of the target reference object, then the target reference object can be edited in the first document. In contrast, in a case that the user does not have the editing permission for the source document of the target reference object, then editing the target reference object is not allowed in the first document. In addition, an instruction box may pop up to apply for permission from the owner of the source document of the target reference object. In this way, in a case that the user is not allowed to edit the target reference object, the user can be intuitively informed of the reason why the user cannot edit, thereby effectively improving the user experience.

In S630, an editing operation on the target reference object in the first document is received.

The target reference object is a content block included in the first document.

In S640, in response to the editing operation, the target reference object in the first document is updated.

In S650, the update information is sent to the server to allow the server to update the target reference object in a second document based on the update information.

The update information includes target reference object identifier and editing content; the second document is a document referencing the target reference object, or the second document is a source document of the target reference object.

Figure 16:
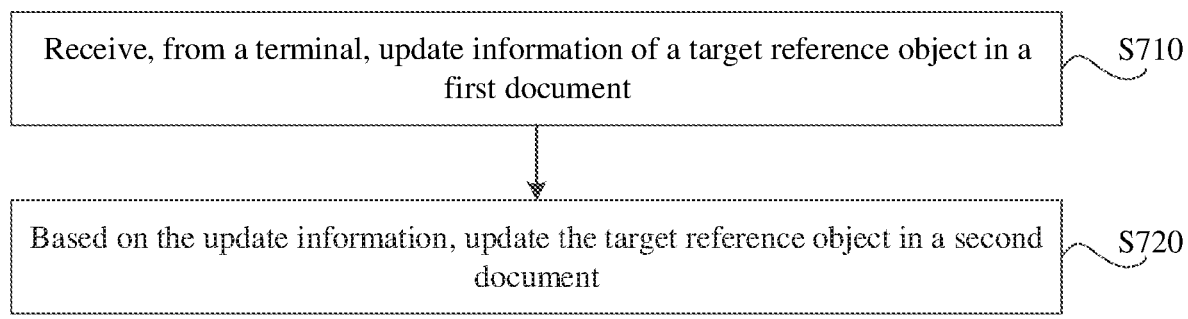
FIG. 16 is a flowchart of a method for document update according to still another embodiment of the present disclosure.

FIG. 16 is a flowchart of a method for document update according to still another embodiment of the present disclosure. This embodiment is applied to the server. As shown in FIG. 16, the method for document update in this embodiment includes steps S710 to S720 as follows.

In S710, update information of a target reference object in a first document is received from a terminal device.

The update information includes a target reference object identifier and editing content; the target reference object is a content block included in the first document.

In S720, based on the update information, the target reference object in the second document is updated.

The second document is a document referencing the target reference object, or the second document is a source document of the target reference object.

In the embodiment, after the user performs an editing operation on the target reference object in the first document, the terminal updates the target reference object in the first document based on the editing operation, and sends the update information to the server. Once receiving from the terminal the update information of the target reference object in the first document, the server updates the target reference object in the second document that has a reference relationship with the first document based on the update information.

In an embodiment, before updating the target reference object in the second document based on the update information, the method further includes: extracting, based on a document identifier of the first document, an associated document identifier from a pre-created document relationship map; determining, based on the associated document identifier, the second document corresponding to the associated document identifier.

In an embodiment, the document relationship map is used to indicate the correspondence relationship between the document identifier of the first document and associated document identifiers. The associated document identifiers refer to identifiers of all second documents that have the reference relationship with the first document. It should be noted that the second document may be a document referencing the target reference object, or the second document may be a source document of the target reference object.

Figure 17:
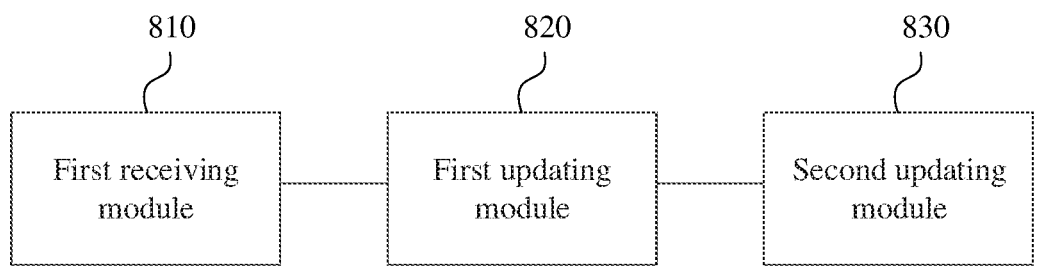
FIG. 17 is a structural block diagram of an apparatus for document update according to an embodiment of the present disclosure.

FIG. 17 is a structural block diagram of an apparatus for document update according to an embodiment of the present disclosure. As shown in FIG. 17, the apparatus for document update in this embodiment includes: a first receiving module 810, a first updating module 820 and a second updating module 830.

The first receiving module 810 is configured to receive an editing operation on a target reference object in a first document; the target reference object is a content block included in the first document.

The first updating module 820 is configured to update the target reference object in the first document, in response to the editing operation.

The second updating module 830 is configured to send update information to a server to allow the server to update a target reference object in a second document based on the update information; where, the update information includes a target reference object identifier and editing content; the second document is a document referencing the target reference object, or the second document is a source document of the target reference object.

On the basis of the foregoing embodiments, the apparatus for document update further includes:
  an acquisition module, configured to, before receiving the editing operation on the target reference object in the first document, acquire the target reference object and/or association information of the target reference object, in response to a reference operation on the target reference object in the second document; where the association information of the target reference object includes a reference source of the target reference object and position information of the target reference object in the source document;
  a first rendering module, configured to render the target reference object and/or association information of the target reference object to the first document.

On the basis of the foregoing embodiments, the rendering module includes:
  a display unit, configured to display a first interaction area in response to receiving a triggering operation performed by a user on the target reference object in the first document, the first interaction area is configured to carry and display reference manner options of the target reference object; and a first receiving unit, configured to receive a selection operation performed by a user on one of the reference manner options in the first interaction area; and a rendering unit, configured to render the target reference object to the first document according to a reference effect corresponding to the reference manner option.

On the basis of the foregoing embodiments, the reference manner corresponding to the reference manner option includes one of real-time reference and non-real-time reference.

On the basis of the foregoing embodiments, the apparatus for document update further includes:

a second receiving module, configured to, before receiving the editing operation on the target reference object in the first document, receive a search operation on the first document and obtaining information about all documents related to target content;

an identification and extraction module, configured to identify and extract the information about all documents related to target content and obtaining a second document carrying the target content; and an insertion module, configured to insert the target reference object included in the second document and the association information of the target reference object into the first document, the target reference object carries the target content.

On the basis of the foregoing embodiments, the apparatus for document update further includes:

a second rendering module, configured to render the latest update time of the target reference object to the first position of the target reference object in the first document or the second document.

On the basis of the foregoing embodiments, the apparatus for document update further includes:

a first display module, configured to display a second interaction area, in response to receiving a triggering operation on the target reference object, where the second interaction area is configured to display reference information of the target reference object.

On the basis of the above embodiments, displaying the second interaction area is specifically configured to:

acquire all reference documents that reference the target reference object and total referenced times;

prioritize, based on a preset priority sorting criterion, the reference documents; and display, in the second interaction area, document information of the reference documents and the total referenced times in sequence.

On the basis of the above embodiments, the document information includes one of a reference document name and a reference document identifier.

On the basis of the foregoing embodiments, the apparatus for document update further includes:

a second display module, configured to, before the updating the target reference object in the second document, display an update control on an interface of the second document, where the update control is configured to update the target reference object referenced in the second document.

On the basis of the foregoing embodiments, the updating the target reference object in the second document is specifically configured to:

add an update source and/or update time for the target reference object in the second document, where the update source includes information of the first document.

On the basis of the foregoing embodiments, the apparatus for document update further includes:

a first determining module, configured to, before receiving the editing operation on the target reference object in the first document, determine whether a reference permission for the source document of the target reference object is authorized, in response to receiving a reference operation on the target reference object;

a reference module, configured to reference the target reference object in the first document, in a case that the reference permission for the source document of the target reference object is authorized.

On the basis of the foregoing embodiments, the apparatus for document update further includes:

a second determination module, configured to, before receiving the editing operation on the target reference object in the first document, determine whether an editing permission for the source document of the target reference object is authorized;

a third receiving module, configured to receive an editing operation on the target reference object in the first document, in a case that the editing permission for the source document of the target reference object is authorized.

The above apparatus for document update can implement the method for document update applied to the client device provided by any embodiment of the present disclosure, which has corresponding functional modules and beneficial effects for implementing the method.

Figure 18:
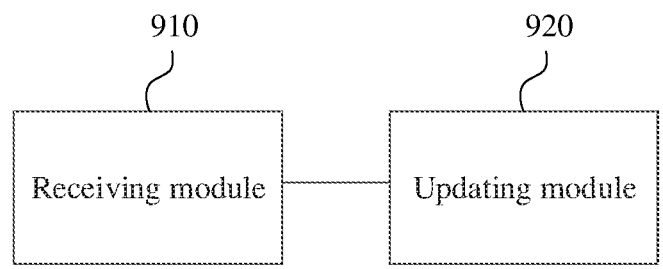
FIG. 18 is a structural block diagram of an apparatus for document update according to another embodiment of the present disclosure.

FIG. 18 is a structural block diagram of an apparatus for document update according to another embodiment of the present disclosure. This embodiment is applied to the server. As shown in FIG. 18, the apparatus for document update in this embodiment includes: a receiving module 910 and an updating module 920.

The receiving module 910 is configured to receive, from a terminal, update information of a target reference object in a first document; the update information includes a target reference object identifier and editing content; the target reference object is a content block included in the first document.

The updating module 920 is configured to update the target reference object in a second document based on the update information; the second document is a document referencing the target reference object, or the second document is a source document of the target reference object.

On the basis of the above embodiments, the apparatus for document update applied to the server further includes:

an extraction module, configured to, before the updating the target reference object in the second document based on the update information, extract based on a document identifier of the first document, an associated document identifier from a pre-created document relationship map;

a determination module, configured to determine the second document corresponding to the associated document identifier based on the associated document identifier.

The above apparatus for document update can implement the method for document update applied to the server provided by any embodiment of the present disclosure, which has corresponding functional modules and beneficial effects for implementing the method.

Figure 19:
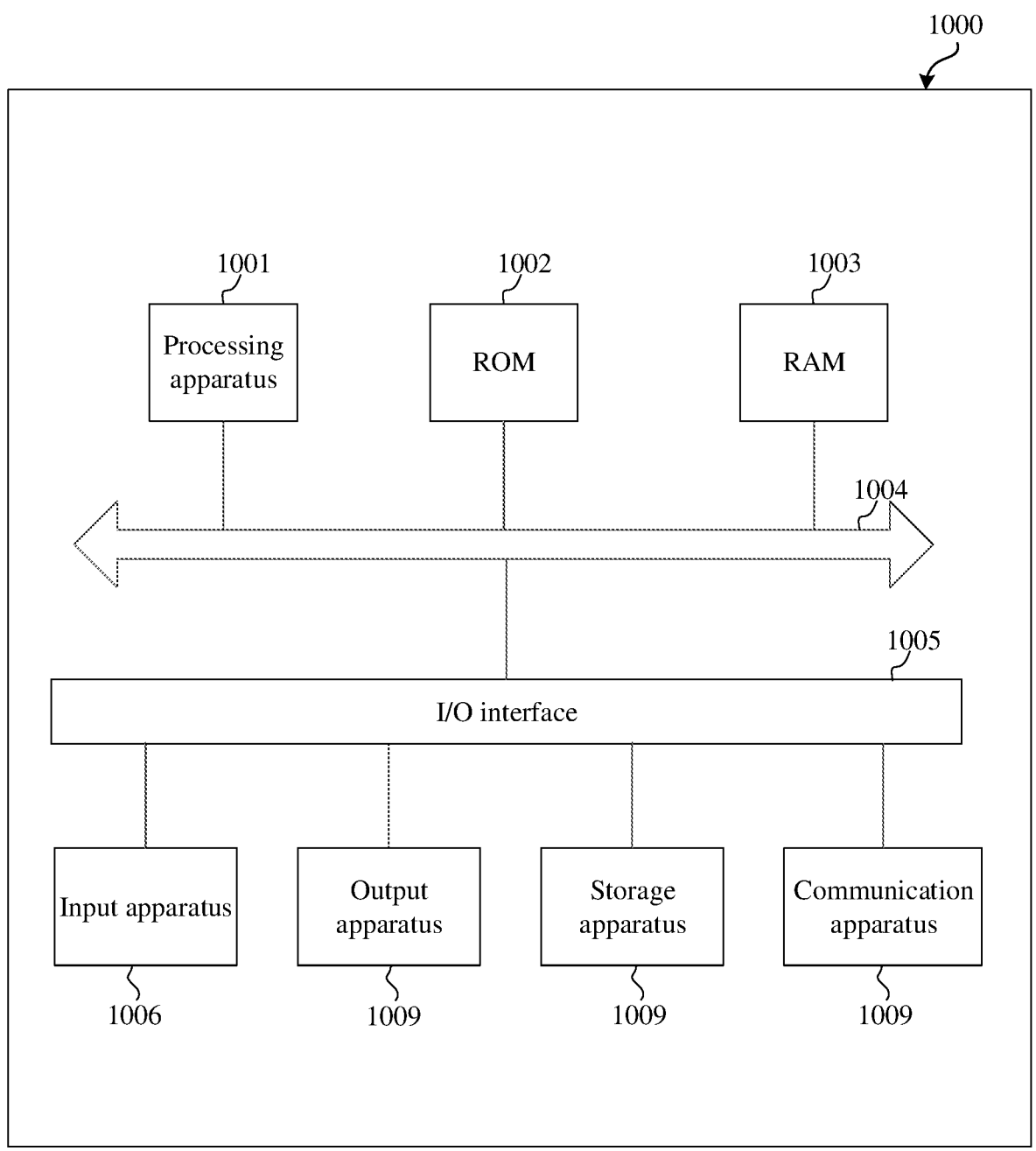
FIG. 19 is a structural block diagram of a document update device according to an embodiment of the present disclosure.

FIG. 19 is a schematic structural diagram of a document update device according to an embodiment of the present disclosure. Referring to FIG. 19 hereinafter, FIG. 19 illustrates a schematic structural diagram which is suitable for implementing the electronic device 1000 according to an embodiment of the present disclosure. The terminal device in the embodiment of the present disclosure may include, but is not limited to, mobile terminals, such as mobile phones, laptops, digital broadcast receivers, personal digital assistants (PDAs), tablet computers (PADs), portable multimedia players (PMPs), vehicle-mounted terminals (such as in-vehicle navigation terminals) and the like, and stationary terminals such as digital TVs, desktop computers and the like. It should be noted that the electronic device shown in FIG. 19 is only an example and should not impose any limitations on the functions and scope of use of the embodiments of the present disclosure.

As shown in FIG. 19, the electronic device 1000 for document processing may include a processing apparatus (such as a central processor and a graphic processor) 1001. The processing apparatus 1001 may perform various appropriate actions and processing based on programs stored in a read-only memory (ROM) 1002 or programs uploaded from a storage apparatus 1008 to a random access memory (RAM) 1003. Various programs and data required for operations of the electronic device 1000 are also stored in the RAM 1003. The processing apparatus 1001, the ROM 1002 and the RAM 1003 are connected to each other through the bus 1004. An input/output (I/O) interface 1005 is also connected to the bus 1004.

Generally, the following apparatuses may be connected to the I/O interface 1005: an input apparatus 1006 such as a touch screen, a touch panel, a keyboard, a mouse, a camera, a microphone, an accelerometer, and gyroscope; an output apparatus 1007 such as a liquid crystal display (LCD), a loudspeaker and a vibrator; a storage apparatus 1008 such as a magnetic tape and a hard disk; and a communication apparatus 1009. The communication apparatus 1009 may allow the electronic device 1000 to communicate with other device in a wired or wireless manner to exchange data. Although FIG. 19 illustrates the electronic device 1000 provided with various apparatuses, it should be understood that not all shown apparatuses are required to be implemented or included. Alternatively, more or less apparatuses may be implemented or included.

Particularly, according to the embodiments of the present disclosure, the process described above in conjunction with flowcharts may be implemented as a computer software program. For example, a computer program product is further provided according to an embodiment of the present disclosure, including a computer program carried on a non-transitory computer readable medium. The computer program includes the program codes for implementing the methods as shown in the flowcharts. In the embodiment, the computer program may be downloaded and installed from the network via the communication apparatus 1009, or installed from the storage apparatus 1008, or installed from the ROM 1002. When the computer program is executed by the processing apparatus 1001, the functions defined in the methods according to the embodiments of the present disclosure are performed.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The more specific examples of the computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client device and the server may perform communication by using any currently known network protocol such as Hyper Text Transfer Protocol (HTTP) or any network protocol to be developed in the further, and may connect with digital data communication (for example, a communication network) in any form or carried in any medium. Examples of the communication network include a local area network (LAN), a wide area network (WAN), Internet, and an end-to-end network (such as, ad hoc end-to-end network), and any currently known or future developed network.

The above computer readable medium may be included in the electronic device above or may stand alone without being assembled into the electronic device.

The above computer readable medium carries one or more programs. The one or more programs, when executed by the electronic device, cause the electronic device to: receive an editing operation on a target reference object in a first document, where the target reference object is a content block included in the first document; update, in response to the editing operation, the target reference object in the first document; and send update information to a server to allow the server to update a target reference object in a second document based on the update information; where the update information includes a target reference object identifier and editing content, the second document is a document referencing the target reference object, or the second document is a source document of the target reference object.

Alternatively, the above computer readable medium carries one or more programs. The one or more programs, when executed by the electronic device, cause the electronic device to: receive, from a terminal, update information of a target reference object in a first document; the update information includes a target reference object identifier and editing content; the target reference object is a content block included in the first document; and update, based on the update information, the target reference object in the second document; the second document is a document referencing the target reference object, or the second document is a source document of the target reference object.

In an embodiment of the present disclosure, computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architectures, functions and operations which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or operations, or may be realized by a combination of dedicated hardware and computer instructions.

The units mentioned in the description of the embodiments of the present disclosure may be implemented by means of software or otherwise by means of hardware. A name of the units does not constitute a limitation to the units in some case. For example, the first acquisition unit may also be described as "a unit for acquiring at least two IP addresses".

The functions described above herein may be at least partially performed by one or more hardware logic components. For example, the hardware logic component may include but not limited to: a field programmable gate array (FPGA), an application specific integrated circuit (ASIC), an application specific standard product (ASSP), a system on chip (SOC), a complex programmable logic device (CPLD) and so on.

It the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any appropriate combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof.

According to one or more embodiments of the present disclosure, a method, apparatus and device for document update and a medium are provided. The method includes as follows:

receiving an editing operation on a target reference object in a first document, where the target reference object is a content block included in the first document;

updating, in response to the editing operation, the target reference object in the first document; and sending update information to a server to allow the server to update the target reference object in a second document based on the update information;

where, the update information includes a target reference object identifier and editing content; the second document is a document referencing the target reference object, or the second document is a source document of the target reference object.

According to one or more embodiments of the present disclosure, a method, apparatus and device for document update and a medium are provided. Before receiving the editing operation on the target reference object in the first document, the method further includes: acquiring, in response to a reference operation on the target reference object in the second document, the target reference object and/or association information of the target reference object; where the association information of the target reference object includes a reference source of the target reference object and position information of the target reference object in the source document; and rendering the target reference object and/or association information of the target reference object to the first document.

According to one or more embodiments of the present disclosure, a method, apparatus and device for document update and a medium are provided. The rendering the target reference object and/or association information of the target reference object to the first document includes: displaying, in response to receiving a triggering operation performed by a user on the target reference object in the first document, a first interaction area, where the first interaction area is configured to carry and display reference manner options of the target reference object; and receiving a selection operation performed by a user on one of the reference manner options in the first interaction area; and rendering, according to a reference effect corresponding to the reference manner option, the target reference object to the first document.

According to one or more embodiments of the present disclosure, a method, apparatus and device for document update and a medium are provided. The reference manner corresponding to the reference manner option includes one of real-time reference and non-real-time reference.

According to one or more embodiments of the present disclosure, a method, apparatus and device for document update and a medium are provided. Before receiving the editing operation on the target reference object in the first document, the method further includes: receiving a search operation on the first document and obtaining information about all documents related to target content; identifying and extracting the information about all documents related to target content and obtaining a second document carrying the target content; and inserting the target reference object included in the second document and the association information of the target reference object into the first document, where the target reference object carries the target content.

According to one or more embodiments of the present disclosure, a method, apparatus and device for document update and a medium are provided. The method for document update further includes: rendering the latest update time of the target reference object to the first position of the target reference object in the first document or the second document.

According to one or more embodiments of the present disclosure, a method, apparatus and device for document update and a medium are provided. The method for document update further includes: displaying, in response to receiving a triggering operation on the target reference object, a second interaction area, where the second interaction area is configured to display reference information of the target reference object.

According to one or more embodiments of the present disclosure, a method, apparatus and device for document update and a medium are provided. The displaying a second interaction area includes: acquiring all reference documents that reference the target reference object and total referenced times; prioritizing, based on a preset priority sorting criterion, the reference documents; and displaying, in the second interaction area, document information of the reference documents and the total referenced times in sequence.

According to one or more embodiments of the present disclosure, a method, apparatus and device for document update and a medium are provided. The document information includes one of reference document name and reference document identifier.

According to one or more embodiments of the present disclosure, a method, apparatus and device for document update and a medium are provided. Before the updating the target reference object in the second document, the method further includes:
  displaying an update control on an interface of the second document, where the update control is configured to update the target reference object referenced in the second document.

According to one or more embodiments of the present disclosure, a method, apparatus and device for document update and a medium are provided. The updating the target reference object in the second document includes: adding an update source and/or update time for the target reference object in the second document, where the update source includes information of the first document.

According to one or more embodiments of the present disclosure, a method, apparatus and device for document update and a medium are provided. Before receiving the editing operation on the target reference object in the first document, the method further includes: determining, in response to receiving a reference operation on the target reference object, whether a reference permission for the source document of the target reference object is authorized; referencing, in the first document, the target reference object, in a case that the reference permission for the source document of the target reference object is authorized.

According to one or more embodiments of the present disclosure, a method, apparatus and device for document update and a medium are provided. Before receiving the editing operation on the target reference object in the first document, the method further includes: determining whether an editing permission for the source document of the target reference object is authorized; receiving, in a case that the editing permission for the source document of the target reference object is authorized, the editing operation on the target reference object in the first document.

According to one or more embodiments of the present disclosure, a method, apparatus and device for document update and a medium are provided. The method for document update includes:
  receiving, from a terminal, update information of a target reference object in a first document, where the update information includes a target reference object identifier and editing content; the target reference object is a content block included in the first document; and
  updating, based on the update information, the target reference object in the second document; where the second document is a document referencing the target reference object, or the second document is a source document of the target reference object.

According to one or more embodiments of the present disclosure, a method, apparatus and device for document update and a medium are provided. Before the updating, based on the update information, the target reference object in the second document, the method further includes: extracting, based on a document identifier of the first document, an associated document identifier from a pre-created document relationship map; and determining, based on the associated document identifier, the second document corresponding to the associated document identifier.

The above description merely illustrates the preferred embodiments of the present disclosure and the technical principles employed. Those skilled in the art should understand that the scope of present disclosure is not limited to the technical solutions formed by certain combination of the above-mentioned technical features, and should also cover other technical solutions formed by any combination of the above-mentioned technical features and any equivalent features without departing from the disclosed concept. For example, a technical solution formed by replacing the features with the technical features disclosed in the present disclosure (but not limited to) with similar functions.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in the context of an individual embodiment may also be implemented in combination in an individual embodiment. Otherwise, the features described in the context of an individual embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. Rather, the specific features and actions described above are only examples of the implementation of the claims.

The invention claimed is:

1. A method for document update, comprising:
receiving an editing operation on a target reference object in a first document, wherein the target reference object is a content block included in the first document;
updating, in response to the editing operation, the target reference object in the first document; and
sending update information to a server to allow the server to update the target reference object in a second document based on the update information;
wherein the update information comprises a target reference object identifier and editing content; the second document is a document referencing the target reference object, or the second document is a source document of the target reference object, wherein the second document is determined based on an associated document identifier extracted from a pre-created document relationship map by using a document identifier of the first document.

2. The method for document update according to claim 1, wherein before receiving the editing operation on the target reference object in the first document, the method further comprises:
in response to a reference operation on the target reference object in the second document, acquiring at least one of the target reference object and association information of the target reference object, wherein the association information of the target reference object comprises a reference source of the target reference object and position information of the target reference object in the reference source; and
rendering at least one of the target reference object and association information of the target reference object to the first document.

3. The method for document update according to claim 2, wherein the rendering at least one of the target reference object and association information of the target reference object to the first document comprises:
displaying, in response to receiving a triggering operation performed by a user on the target reference object in the first document, a first interaction area, wherein the first interaction area is configured to carry and display reference manner options of the target reference object; and
receiving a selection operation performed by a user on one of the reference manner options in the first interaction area; and
rendering, according to a reference effect corresponding to the reference manner option, the target reference object to the first document.

4. The method for document update according to claim 3, wherein the reference manner corresponding to the reference manner option comprises one of real-time reference and non-real-time reference.

5. The method for document update according to claim 1, wherein before receiving the editing operation on the target reference object in the first document, the method further comprises:
receiving a search operation on the first document and obtaining information about all documents related to target content;
identifying and extracting the information about all documents related to target content and obtaining a second document carrying the target content; and
inserting the target reference object included in the second document and the association information of the target reference object into the first document, wherein the target reference object carries the target content.

6. The method for document update according to claim 1, further comprising:
displaying, in response to receiving a triggering operation on the target reference object, a second interaction area, wherein the second interaction area is configured to display reference information of the target reference object.

7. The method for document update according to claim 6, wherein displaying the second interaction area comprises:
acquiring all reference documents associated with the target reference object and total referenced times;
prioritizing, based on a preset priority sorting criterion, the reference documents; and
displaying, in the second interaction area, document information of the reference documents and the total referenced times in sequence.

8. The method for document update according to claim 7, wherein the document information comprises one of reference document name and reference document identifier.

9. The method for document update according to claim 1, wherein before updating the target reference object in the second document, the method further comprises:
displaying an update control on an interface of the second document, wherein the update control is configured to update the target reference object referenced in the second document.

10. The method for document update according to claim 1, wherein the updating the target reference object in the second document comprises:
adding at least one of an update source and update time for the target reference object in the second document, wherein the update source comprises information of the first document.

11. The method for document update according to claim 1, wherein before receiving the editing operation on the target reference object in the first document, the method further comprises:
determining, in response to receiving a reference operation on the target reference object, whether a reference permission for the source document of the target reference object is authorized;
referencing, in the first document, the target reference object, in a case that the reference permission for the source document of the target reference object is authorized.

12. The method for document update according to claim 1, wherein before receiving the editing operation on the target reference object in the first document, the method further comprises:
determining whether an editing permission for the source document of the target reference object is authorized;
receiving, in a case that the editing permission for the source document of the target reference object is authorized, the editing operation on the target reference object in the first document.

13. A method for document update, comprising:
receiving, from a terminal device, update information of a target reference object in a first document, wherein the update information comprises a target reference object identifier and editing content, and the target reference object is a content block included in the first document;
extracting, based on a document identifier of the first document, an associated document identifier from a pre-created document relationship map, and determining, based on the associated document identifier, a second document corresponding to the associated document identifier; and updating, based on the update information, the target reference object in the second document, wherein the second document is a document referencing the target reference object, or the second document is a source document of the target reference object.

14. A document update device, comprising:
one or more processors; and
a memory, configured to store one or more programs;
wherein the one or more programs, when executed by the one or more processors, cause the one or more processors to:
receive an editing operation on a target reference object in a first document, wherein the target reference object is a content block included in the first document;
update the target reference object in the first document, in response to the editing operation; and
send update information to a server to allow the server to update the target reference object in a second document based on the update information, wherein the update information comprises a target reference object identifier and editing content, the second document is a document referencing the target reference object, or the second document is a source document of the target reference object, wherein the second document is determined based on an associated document identifier extracted from a pre-created document relationship map by using a document identifier of the first document.

15. A document update device, comprising:
one or more processors; and
a memory, configured to store one or more programs;
wherein the one or more programs, when executed by the one or more processors, cause the one or more processors to:
receive, from a terminal device, update information of a target reference object in a first document, wherein the update information comprises a target reference object identifier and editing content, and the target reference object is a content block included in the first document;
extract, based on a document identifier of the first document, an associated document identifier from a pre-created document relationship map, and determine, based on the associated document identifier, a second document corresponding to the associated document identifier; and
update the target reference object in the second document based on the update information, wherein the second document is a document referencing the target reference object, or the second document is a source document of the target reference object.

16. A non-transitory computer storage medium storing a computer program thereon, wherein the computer program, when executed by a processor, implements the method for document update according to claim 1.

17. A non-transitory computer storage medium storing a computer program thereon, wherein the computer program, when executed by a processor, implements the method for document update according to claim 13.

* * * * *